United States Patent Office 2,933,481
Patented Apr. 19, 1960

2,933,481

CURABLE HEXAFLUOROPROPENE-VINYLIDENE FLUORIDE COMPOSITION

John Scott Rugg, Wilmington, Del., assignor to E. I. du Pont de Nemours and Company, Wilmington, Del., a corporation of Delaware No Drawing. Application September 30, 1957
Serial No. 686,895

4 Claims. (Cl. 260—87.7)

This invention relates to the curing of elastomers, and mort particularly to providing non-scorchy curing agents for vinylidene fluoride-hexafluoropropene copolymer elastomers.

Copolymers of vinylidene fluoride and hexafluoropropene when containing from 30% to 70% by weight of vinylidene fluoride units and 70% to 30% by weight of hexafluoropropene units are inherently elastomeric in nature, being plastic polymers prior to curing but, like many other elastomers, on curing or vulcanizing are transformed into tough, rubbery products.

Various methods have heretofore been suggested for curing this particular copolymer elastomer, such as heating with polyamines or organic peroxides, or by irradiating with high intensity beta or gamma rays. The cured stocks are particularly valuable because of their good resistance to compression set and to solvents, oils, greases and similar materials even at high temperatures.

The aliphatic polyamines previously suggested as curing agents for this type of elastomer, such as diethylene triamine, triethylenetetramine, hexamethylene diamine, hexamethylene tetramine and the like, are too scorchy to be of practical use, that is, stocks containing these aliphatic polyamines prematurely cure while being processed in conventional equipment under conditions of temperature and time normally encountered in commercial practice, while the aromatic polyamines are not effective for curing these particular copolymers. While sulfur has been found to be beneficial in achieving safe process control in such stocks, it has an adverse effect on the properties of the vulcanizate. Hexamethylene diamine carbamate, while providing stocks which are not scorchy, must be carefully employed, for it is difficult to disperse in the elastomer and tends to give blown stocks unless care is taken to provide for the smooth elimination of carbon dioxide during the curing cycle.

It is an object of the present invention to provide curing agents for elastomeric copolymers of vinylidene fluoride-hexafluoropropene which can be readily incorporated in the copolymer by the usual rubber milling processes and which give stocks which can be compounded and formed into shapes without undergoing premature cure at normal processing temperatures, and which at somewhat higher temperatures are readily cured to produce elastic products.

According to the present invention, a non-scorchy yet thermally curable stock of a vinylidene fluoride-hexafluoropropene copolymer containing from 30% to 70% by weight of vinylidene fluoride units and from 70% to 30% by weight of hexafluoropropene units can be produced by homogeneously incorporating therein from 0.5 to 2 parts, per 100 parts by weight of the copolymer, of a compound of the group consisting of diaminocyclohexanes and bis(4-aminocyclohexyl) alkanes as the curing agent. The diaminocyclohexanes may be the 1,2- diamino-,1,3-diamino- or the 1,4-diaminocyclohexanes, and the alkane group in the bis(4-aminocyclohexyl) alkane contains from 1 to 3 carbon atoms including the 1,1- and 2,2-propanes. The resulting stocks are characterized by being non-scorchy, that is, safe processing stocks, in that they may be milled, extruded, calendered or otherwise processed and shaped at temperatures up to about 250° F. without premature curing, and in being curable to elastic, rubbery products by heating at temperatures of from 300° to 500° F.

The present invention is applicable to the rubber-like copolymers of vinylidene fluoride and hexafluoropropene containing 30%–70% by weight of vinylidene fluoride units and 70%–30% by weight of hexafluoropropene units, and more particularly to the elastomeric stock consisting of 60% vinylidene fluoride and 40% hexafluoropropene. These elastomeric copolymers may be prepared in high conversions by either batch or continuous processes in which the monomers are copolymerized in aqueous systems at from 20° to 150° C. and at from 250 to 1500 pounds per square inch in the presence of polymerization initiators such as peroxy compounds, activators such as sodium bisulfite, a buffer such as disodium hydrogen phosphate, and a dispersant such as ammonium salt of a polyfluorocarboxylic acid.

Since hexafluoropropene does not homopolymerize under the conditions above mentioned, an excess of this monomer over the quantity desired in the copolymer will usually be employed. In the batch process from 60 to 15 parts by weight of vinylidene fluoride will be copolymerized with from 40 to 85 parts by weight of hexafluoropropene to give products containing from 30% to 70% by weight of hexafluoropropene.

In carrying out the reaction as a continuous process, copolymers having more uniform properties are obtained than when the process is carried out as a batch process. A satisfactory manner for producing the copolymer by the continuous process is to feed the monomers in a constant ratio (in the proportion desired in the copolymer) into a constant volume of reactor simultaneously with an aqueous catalyst solution of constant composition. Under conditions of constant temperature, pressure and constant ratio of total monomers fed to the polymerization initiator, a constant conversion of the monomers to copolymers results. In either the batch or the continuous process the quantity of initiator employed may be as low as about 0.001% and as high as about 5%, although preferably from 0.001% to 2%, based on the weight of the monomers, will be employed.

The cycloaliphatic polyamines employed as curing agents in producing the stocks of the present invention are known and readily available compounds. The diamino cyclohexanes are conveniently prepared by reduction of the corresponding diamino-, aminonitro- or dinitrobenzenes. The bis(aminocyclohexyl) alkanes are likewise obtained by well known methods such as by coupling 2 mols of aniline with a mol of an aldehyde or ketone, followed by reduction. For example, bis(4-aminophenyl)methane is obtained by reacting aniline with formaldehyde in the presence of acid, and catalytically hydrogenating to the bis(4-amino-cyclohexyl)methane.

The quantity of the cycloaliphatic polyamine employed will depend primarily on the state of cure desired in the vulcanizate. Normally, quantities of from 0.5 to 2 parts, and preferably 0.75 to 1.5 parts, based on 100 parts of the copolymer, will be employed. These curing agents are easily and readily dispersed in the stocks by the usual rubber milling procedures.

The copolymers of the present invention with which the non-scorchy curing agents are employed may be compounded in the same manner as other elastomers, by the incorporation of acid acceptors, fillers, softeners or chemical plasticizers. Where highly heat-resistant vulcanizates are desired, an acid acceptor such as an oxide of zinc, magnesium or lead will be employed. Dibasic lead phosphite, which often improves the state of cure, will generally be used in conjunction with such metal oxides. The metal oxide and dibasic lead phosphite may be employed in varying quantities (5 to 25 parts), depending upon the effects desired and the end use of the product.

Fillers and reenforcing agents such as carbon blacks and the known wide variety of mineral fillers, may be employed in varying quantities such as from 10 to 60 parts, depending upon the degree of hardness, heat resistance and stability in general desired in the cured product. The carbon blacks may be those normally used in elastomers, such as thermal, furnace and channel blacks. Mineral fillers including the fine silicas, clays and diatomaceous earth, may be used. Alkaline fillers such as alkaline carbon blacks and silicas are preferred.

The raw stocks (the uncured polymers) have Mooney viscosities and Williams plasticity and recovery values comparable with conventional elastomers and therefore may be milled, compounded, extruded, molded, calendered, and the like, by the usual methods and in the usual equipment employed in the rubber industry.

The following general procedures illustrate preparations and curing of the compounded stocks. The raw copolymer (uncured) is preferably milled and compounded on a cool mill, as it tends to stick when hot. The ingredients may be added at any time in any order but usually acid acceptor first, then filler, other additives, and curing agent last. The compounded stocks containing the curing agents of this invention are stable in storage under ordinary conditions. They may be molded and cured by a two-stage combination of press curing and oven curing, the latter being designed to achieve the ultimate state of cure. The time and temperature of the molding should be sufficient to prevent blistering and deformation of the stock when the mold is opened. In general, heating for from 10 to 60 minutes at from 275° to 325° F. is sufficient, although somewhat higher temperatures may be used, in the molding operation. In the second stage, the partially cured stocks may be held in an oven at 400° to 500° F. to obtain optimum vulcanizate properties, about 16 to 24 hours' exposure at 400° F. being roughly equivalent to 4 hours at 450° F. The compounded stocks containing the curing agents of this invention may be extruded and calendered at temperatures up to about 250° F. and then brought to a state of optimum cure by oven-curing. If desired, such processed stocks may first be prepared for oven-curing by exposure at 50 to 100 p.s.i. steam or air pressure.

The elastomers of this invention can be used for the manufacture of films, foils, tapes, fibers and articles of any desired shape, and can be used as coatings for wires, fabrics, ceramics, etc., and for the impregnation of felt which may be made from various fibers since the products can be extruded and molded under pressure. Examples of such products are: molded O-ring seals for hydraulic systems and extruded hose for high temperature and high pressure lubricants, for automotive and aircraft use; protective clothing, equipment lining, and diaphragms for control apparatus; and the like, where high resistance to chemical attack and thermal break-down is desired. In addition to molded, calendered and extruded mechanical goods, films may be prepared by casting the elastomeric compositions from solvents (such as aliphatic ketones). Such films may be self-supporting or supported on a variety of bases such as fabrics, metals, ceramics, etc.

The following examples are given to further illustrate the invention, in which the parts and percentages employed are by weight unless otherwise specified.

Example 1

Hexafluoropropene is passed at a rate of 2 pounds per hour and vinylidene fluoride at 3 pounds per hour into a one gallon stainless steel constant volume reactor which is equipped with an agitator, two inlet lines and an outlet line leading to a receiver. The above monomers are introduced simultaneously through one inlet line which extends to near the bottom of the reactor. Simultaneously the initiator-dispersant solution made up of:

135 parts of ammonium persulfate
27 parts of sodium bisulfate
284 parts of disodium hydrogen phosphate
30 parts of ammonium perfluorooctanoate, and
21,000 parts of deoxygenated water is pumped at a rate of 1.06 gallons per hour into the reactor through the other inlet line near its top. The reaction mass is agitated continuously and maintained at 100° C. and 900 p.s.i. The outlet line, which leads from the top of the reactor, is connected to a receiver for the product through a pressure release valve. A pressure of 900 p.s.i. is maintained in the reactor. When the pressure in the reactor exceeds the 900 p.s.i., a steady stream of copolymer emulsion escapes from the reactor through the outlet line into the receiver (which is conveniently at atmospheric pressure). The latex obtained after the second hour of operation is coagulated by the addition of sodium chloride, and the water-insoluble copolymer is collected, washed with water and dried. Analysis shows the copolymer to be made up of 40% hexafluoropropene units and 60% vinylidene fluoride units by weight.

Example 2

(A) A sample of the copolymer prepared as described above is compounded on a rubber mill at 25° to 50° F. with the following ingredients, which are added in the order listed below:

Formulation: | Parts
--- | ---
Raw polymer | 100
Zinc oxide | 10
Dibasic lead phosphite | 10
MT carbon black | 18
1,3-diaminocyclohexane | 1

The safe-processing character of this compounded stock, that is, its resistance to premature cure during subsequent processing, is shown by Mooney Scorch data obtained for this stock according to the procedure described in ASTM D 1077–49T, using the small rotor at 250° F. For example, the time required for the Mooney viscosity to rise 10 units from the low reading of 20 at 250° F. is 25 minutes, which correlates with the processability of this stock in extrusion tests.

(B) In a comparative test in which the above formulation is employed except that the diamino cyclohexane is replaced by 1.0 part of triethylene tetramine (a typical polyamine originally used in curing this copolymer), there is a 10 point rise from a low reading of 24 in Mooney viscosity in only 4 minutes at 250° F., and this stock is not processable, e.g. extrudable, without scorching.

(C) The above compounded formulation of this invention, that is, containing 1,3-diaminocyclohexane, is valuable for the preparation of mechanical goods of varied uses mentioned above, as indicated by the properties given below of the vulcanizate derived therefrom. The stock is placed in a mold and is press cured for 30 minutes at 275° F. The mold is allowed to cool to about 150° F., the molded stock removed, and then placed in a 400° F. oven for 24 hours. The product shows the following properties:

Tensile strength, p.s.i | 2375
--- | ---
Elongation at break, percent | 380
Hardness, Shore A | 75
Permanent set at break, percent | 2
ASTM Compression set—method B (70 hrs. at 250° F.), percent | 24

(D) Replacing the 1,3-diaminocyclohexane by 1.4 parts of bis(4-aminocyclohexyl)methane in the above formulation produces a stock which in the Mooney Scorch Test referred to above shows a 10 point rise in Mooney viscosity in 40 minutes at 250° F. (a ten-fold increase in scorch resistance over that observed for the stock containing triethylene tetramine). Subjected to the curing conditions described above, this stock is transformed into a rubbery product having a tensile strength of 2500 p.s.i.

(E) Further increase in process safety may be achieved using smaller quantities of the cycloaliphatic diamines. For example, use of 0.7 part of 1,3-diaminocyclohexane in the above formulation produces a stock which does not show a 10 point rise from a low reading of 21 in Mooney viscosity in 45 minutes at 250° F. in the Mooney Scorch Test, and which is also curable to a rubbery product (tensile strength 2000 p.s.i.) under the conditions of cure given above.

It is noteworthy that the use of 0.7 part of 1,3-diaminobenzene in the above formulation produces a stock whose Mooney viscosity at 250° F. rises 10 points in 45 minutes, but this stock does not cure to a rubbery product; instead, a blistered, porous, plastic mass is produced. Similarly, other aromatic polyamines, e.g. 4,4'-diaminodiphenylmethane and 4,4'-diaminodiphenylamine, fail to produce useful rubbery vulcanizates.

Substantially the same relative order of results as given in the examples is obtained in comparative tests with other compounded formulations, for example, on replacing the carbon black of the formulation of Example 2 with a mineral filler such as an 80/20 mixture of a fine silica and a low molecular weight silicone oil and compounding with 1.3 parts of 1,3-diaminocyclohexane. The stocks are non-scorchy, and are cured by the method of Example 2–C to form desirable tough, rubbery products.

The 1,2-diaminocyclohexane, the 1,4-diaminocyclohexane and the 2,2-bis(4-aminocyclohexyl)propane give similar non-scorchy stocks when incorporated in the vinylidene fluoride-hexafluoropropene elastomer in the manner illustrated in the above examples.

I claim:
1. A non-scorchy, thermally curable elastomeric vinylidene fluoride-hexafluoropropene copolymer consisting of from 30% to 70% by weight of vinylidene fluoride units and 70% to 30% by weight of hexafluoropropene units, having intimately incorporated therein as the curing agent from 0.5 to 2 parts, per 100 parts of copolymer, of a cycloaliphatic polyamine of the group consisting of diaminocyclohexane and bis(4-aminocyclohexyl)alkane in which the alkane group contains from 1 to 3 carbon atoms.

2. A non-scorchy, thermally curable elastomeric vinylidene fluoride-hexafluoropropene copolymer containing 60% by weight of vinylidene fluoride units and 40% by weight of hexafluoropropene units, having intimately incorporated therein as the curing agent from 0.75 to 1.5 parts of 1,3-diaminocyclohexane per 100 parts of copolymer.

3. A non-scorchy, thermally curable elastomeric vinylidene fluoride-hexafluoropropene copolymer containing 60% by weight of vinylidene fluoride units and 40% by weight of hexafluoropropene units, having intimately incorporated therein as the curing agent from 0.75 to 1.5 parts of bis(4-aminocyclohexyl)methane.

4. A non-scorchy, thermally curable elastomeric vinylidene fluoride-hexafluoropropene copolymer containing 60% by weight of vinylidene fluoride units and 40% by weight of hexafluoropropene units, having intimately incorporated therein as the curing agent from 0.75 to 1.5 parts of 2,2-bis(4-aminocyclohexyl)propane.

References Cited in the file of this patent
UNITED STATES PATENTS

| | | |
|---|---|---|
| 2,451,174 | Reuter | Oct. 12, 1948 |
| 2,793,200 | West | May 21, 1957 |

UNITED STATES PATENT OFFICE

CERTIFICATE OF CORRECTION

Patent No. 2,933,481　　　　　　　　　　　　　April 19, 1960

John Scott Rugg

It is hereby certified that error appears in the printed specification of the above numbered patent requiring correction and that the said Letters Patent should read as corrected below.

Column 1, line 16, for "mort" read -- more --; column 4, line 7, for "sodium bisulfate" read -- sodium bisulfite --; line 43, for "Sorch" read -- Scorch --.

Signed and sealed this 1st day of November 1960.

(SEAL)
Attest:

KARL H. AXLINE　　　　　　　　　　　　　　ROBERT C. WATSON
Attesting Officer　　　　　　　　　　　　　Commissioner of Patents